United States Patent [19]
Gajewski et al.

[11] Patent Number: 5,040,493
[45] Date of Patent: Aug. 20, 1991

[54] AUTOMOTIVE INTAKE MANIFOLD WITH INTEGRAL ALTERNATOR

[75] Inventors: Arthur J. Gajewski, Canton; Richard J. Meckstroth, Northville, both of Mich.

[73] Assignee: Ford Motor Company, Dearborn, Mich.

[21] Appl. No.: 631,113

[22] Filed: Dec. 20, 1990

[51] Int. Cl.⁵ .............................................. F01P 1/06
[52] U.S. Cl. ............................. 123/41.31; 123/52 MC; 310/54
[58] Field of Search .............. 123/41.31, 52 M, 198 E, 123/635, 52 MC; 310/52, 54, 64

[56] References Cited

U.S. PATENT DOCUMENTS

| | | | |
|---|---|---|---|
| 1,784,831 | 12/1930 | Funalman | 123/25 B |
| 2,549,482 | 4/1951 | Kiekhaefer | 123/73 |
| 2,571,872 | 10/1951 | Hayes | 310/68 D |
| 4,164,660 | 8/1979 | Palazzetti | 310/54 |
| 4,267,812 | 5/1981 | Aula et al. | 123/52 MV |
| 4,739,204 | 4/1988 | Kitamura et al. | 310/89 |
| 4,765,283 | 8/1988 | Kitamura et al. | 123/91.31 |
| 4,818,906 | 4/1989 | Kitamura et al. | 310/68 D |
| 4,870,307 | 9/1989 | Kitamura et al. | 310/54 |
| 4,922,148 | 5/1990 | Kitamura | 310/68 D |

Primary Examiner—Noah P. Kamen
Attorney, Agent, or Firm—Jerome R. Drouillard; Clifford L. Sadler

[57] ABSTRACT

An intake manifold and alternator system for an internal combustion engine includes a manifold for conveying intake charge to a plurality of cylinders of an engine and an alternator driven by the engine, with the alternator being housed within a cavity formed within the manifold. Passages conduct liquid coolant from the manifold to the alternator for the purpose of dissipating heat arising within the alternator.

12 Claims, 2 Drawing Sheets

AUTOMOTIVE INTAKE MANIFOLD WITH INTEGRAL ALTERNATOR

BACKGROUND OF THE INVENTION

1. Field of the Invention

This invention relates to an intake manifold and alternator combination for an internal combustion engine which includes not only passages for intake charge moving to the engine's cylinders and also to an integral provision for mounting an engine-driven alternator into the manifold so as to permit liquid cooling of the alternator.

2. Disclosure Information

Belt-driven alternators are commonly used for the purpose of providing electrical energy for operating the many electrically operated devices found in automobiles and other motor vehicles. The most common type of alternator found today is of the air cooled variety, which is mounted by means of bracketry to the front of the engine to permit driving of the alternator by a flexible belt powered by the crankshaft of the engine.

Air cooled alternators frequently produce undesirable noise which rises from the cooling fan incorporated in the alternator itself. Because of the large amounts of current generated by alternators, it is frequently necessary to incorporate aggressive cooling fans in air-cooled units, and such fans often produce an undesirable whine or other high frequency noise. An alternator and manifold according to the present invention will eliminate this noise problem by the use of liquid cooling, thereby obviating the need for a fan arrangement.

The use of liquid cooling provisions for rotating electrical machinery is not new. U.S. Pat. No. 2,571,872 to Hayes discloses an electric motor frame having a coolant system incorporated therein. The use of engine coolant to disperse heat from a vehicle mounted alternator is shown in the prior art. U.S. Pat. No. 4,164,660 to Palazzetti, and U.S. Pat. No. 4,765,283 to Kitamura et al. disclose examples of liquid cooling for generators or alternators. In the context of this specification, the term "alternator" is used generically according to common usage to mean either a conventional alternating current rectified rotating machine, or a conventional DC rotating machine, commonly known as a "generator", or other types of rotating machines used for the purpose of producing electrical power from mechanical power input to the machine by the crankshaft or other moving part of the engine U.S. Pat. No. 4,739,204 and U.S. Pat. No. 4,818,906, both to Kitamura et al., disclose liquid cooled alternators which are adapted to be mounted to a vehicle engine in a conventional manner; i.e., by means of external brackets. Such bracketry is undesirable because the flexure associated with the bracketry can cause noise and vibration problems, not to mention problems associated with durability and reliability and excessive drive belt wear.

U.S. Pat. No. 4,922,148 to Kitamura discloses a partially water cooled alternator for a vehicle in which the rear part of the alternator has cooling passages running therethrough, with the front part of the alternator being fan-cooled.

U.S. Pat. No. 4,870,307 to Kitamura et al. discloses an internally driven block-mounted water cooled AC generator which is mounted to the exterior of an engine block. Unlike an alternator according to the present invention, which is mounted in an aperture or cavity within the intake manifold of an engine so as to take up relatively less space, the alternator disclosed in the '307 patent extends out from the engine a considerable distance and must be driven by a geared arrangement which limits flexibility as to the placement of the unit.

It is an object of the present invention to provide an intake manifold and alternator combination which will allow the alternator to be used without air cooling.

It is an advantage of the present invention that a liquid cooled alternator mounted in an intake manifold according to the present invention will be quiet during its operation and free from vibration due to the rigid mounting structure provided by the intake manifold.

It is a further advantage of the present invention that an alternator and manifold structure according to this invention will occupy less space than conventional manifold and alternator combinations which employ external bracketry for the purpose of mounting the alternator to the front of the engine.

It is yet a further advantage of the present invention that the water cooling of the present alternator may be accomplished without an excessive number of additional conduits or hoses for conducting coolant to and from the alternator.

It is yet another advantage of the present invention that the input sheave to the alternator may be precisely placed because of the manner in which the alternator is mounted to the manifold according to the present invention.

Other features, objects, and advantages of the present invention will become apparent to the reader of the specification.

SUMMARY OF THE INVENTION

An intake manifold and alternator system for an internal combustion engine includes a manifold for conveying intake charge to a plurality of cylinders of the engine and an alternator driven by the engine, with the alternator being housed within the manifold. The manifold comprises a plurality of intake charge passages and at least one passage for conducting liquid coolant from the engine to the alternator. The alternator is housed within a cavity formed in the manifold, and the cavity is supplied with coolant for removing heat from the alternator by means of a secondary coolant passage which communicates with a primary coolant passage in the manifold. Upon entering the cavity formed in the manifold, the coolant flows through a generally annular space defined by the alternator and the cavity. Upon leaving the coolant pathway defined by the alternator and the cavity within the intake manifold, the coolant passes through a discharge passage.

An alternator used in the combination manifold and alternator system according to the present invention preferably has a sealed housing with a rotor journaled therein, with the housing further comprising heat transfer means for conducting heat from inside the housing, preferably in the form of at least one set of conducting structures formed on at least one inner surface of the housing.

DETAILED DESCRIPTION OF THE PREFERRED EMBODIMENTS

Figure 1:
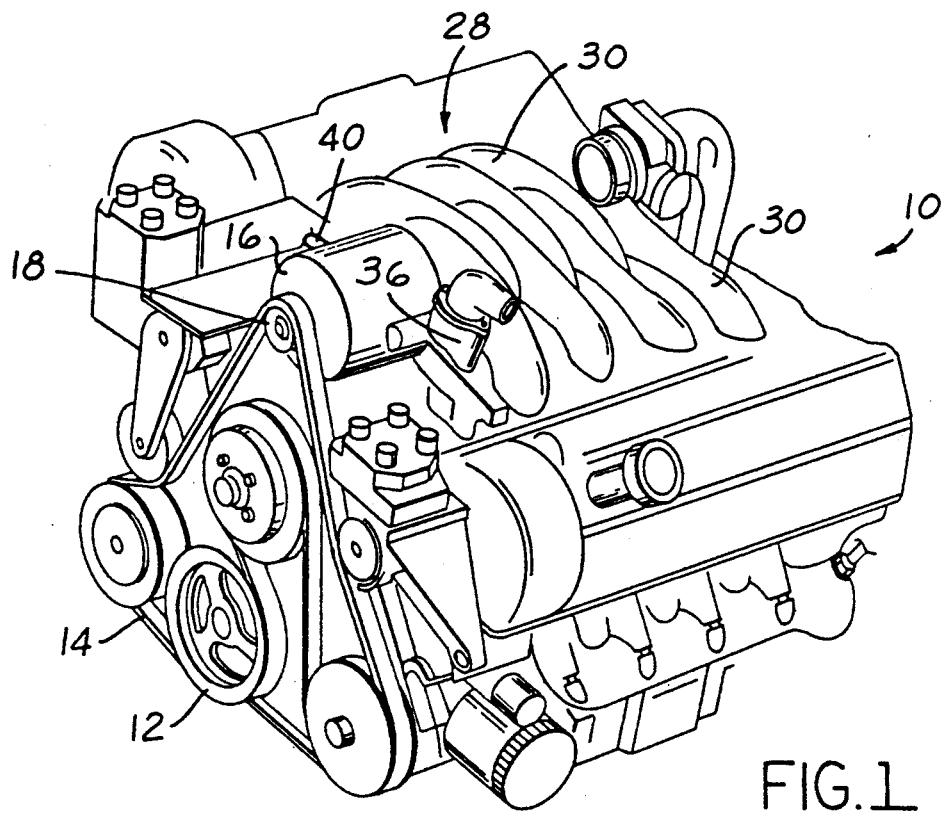
FIG. 1 is a perspective view of an engine having a manifold and alternator assembly according to the present invention.

As shown in FIG. 1, an automotive intake manifold with an integral alternator according to the present invention is intended to be used with an internal combustion engine. Although a V-type engine is illustrated, those skilled in the art will appreciate in view of this disclosure that a manifold and alternator combination according to the present invention could be used with other types of engines, such as those of the in-line configuration.

Engine 10 is equipped with an alternator, 16, which is combined with an intake manifold, 28. The alternator is driven by a crankshaft pulley, 12, which is attached to the crankshaft in conventional fashion. A serpentine drive belt, 14, operating on an alternator pulley, 18, drives the alternator, again in conventional fashion. Those skilled in the art will appreciate in view of this disclosure that an alternator and manifold according to the present invention could be used with other drive arrangements such as v-belts, chains, and other types of power transmission devices.

As shown in FIG. 1, the alternator is oriented by intake manifold 28 so that the central axis of the alternator is parallel to the crankshaft of the engine. This is important because proper operation of a drive belt system depends upon accurate positioning and robust mounting of the accessories being driven by the belt. Misalignment of the various sheaves and idler wheels may cause the drive belt to fail prematurely.

An alternator and manifold system according to the present invention helps to reduce unwanted vibration in the front end accessory drive of an engine by rigidly mounting the alternator within the substantial structure afforded by the intake manifold. This reduction in unwanted vibration will itself reduce undesirable noise emanating from the alternator and its mounting brackets.

Figure 2:
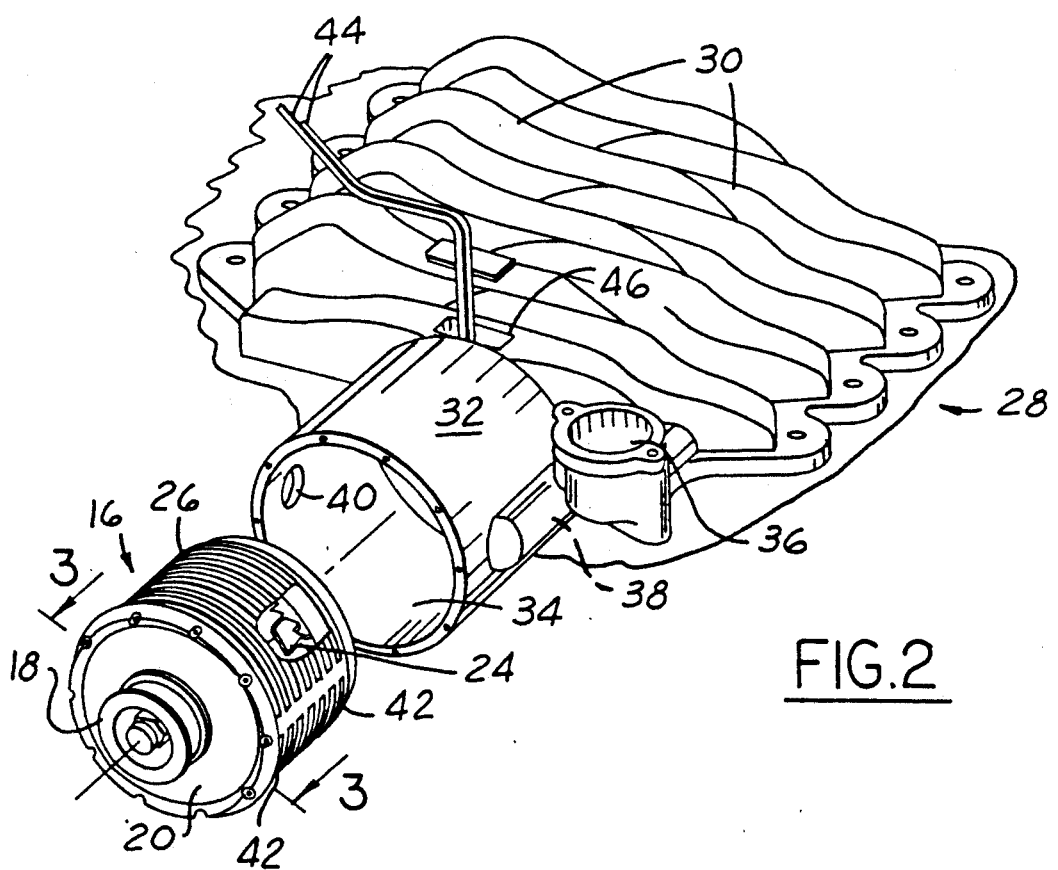
FIG. 2 is an exploded perspective view of a manifold and alternator according to the present invention.

FIG. 2 shows further detail of a manifold and alternator system according to the present invention. Accordingly, manifold 28 has a plurality of runners or intake charge passages, 30, for conveying air or air and fuel mixtures to the cylinders of the engine. Manifold 28 also has a plurality of liquid coolant passages contained therein. A first, or primary, passage, 36, provides an outlet for coolant flowing from the engine to the radiator of the vehicle. A secondary cooling passage, 38, conducts coolant from primary passage 36 into a cavity, 34, which houses alternator 16. Cavity 34 is shown as being generally cylindrical in its overall aspect and is defined by an annular wall extending forward of the charge passage portion of the intake manifold in a direction generally parallel to the crankshaft of the engine. Those skilled in the art will appreciate in view of this disclosure, however, that cavity 34 could comprise other shapes known to those skilled in the art and suggested by this disclosure.

Figure 4:
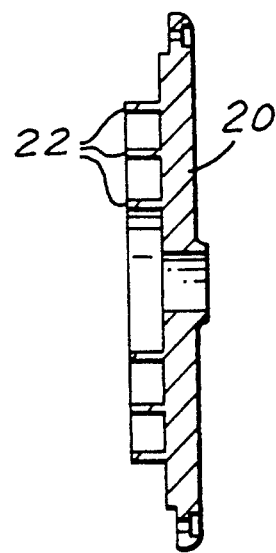
FIG. 4 is a sectional view of the front plate of FIG. 3 taken along the line 4—4 of FIG. 3.

Alternator 16 has a generally cylindrical outer surface with a plurality of cooling ribs 26 formed thereon. The alternator has a plurality of sealing O rings 42, with at least one O ring at the front and rear parts of the alternator assembly. These O rings function to prevent the leakage of coolant from cavity 34. As shown in FIG. 4, front cover 20 of the alternator is flanged and has a number of fastener apertures 21 contained therein for attaching the alternator to the intake manifold.

As shown in FIG. 2, alternator 16 is intended to be inserted as a cartridge into cavity 34 from the front of the engine. Electrical leads 44 are trained out of the manifold through a port 46 formed in the manifold behind cavity 34. The mounting of alternator 16 as a cartridge within cavity 34 allows ready accessibility to the alternator in the event it must be removed for repair or replacement.

Alternator 16 and cavity 34 define an annular space extending between the outer case of the alternator and the inner wall of the cavity. Coolant flowing through primary passage 36 and secondary passage 38 moves through this annular space and then out through discharge passage 40. Upon leaving the discharge passage, the fluid may flow to the radiator or any other appropriate part of the cooling system of the engine. Those skilled in the art will appreciate in view of this disclosure that the inner surface of alternator cavity 34 and the outer surface of alternator 16 could have other types of cooling channels formed therein depending upon the particular needs of an alternator under consideration according to the present invention.

Figure 3:
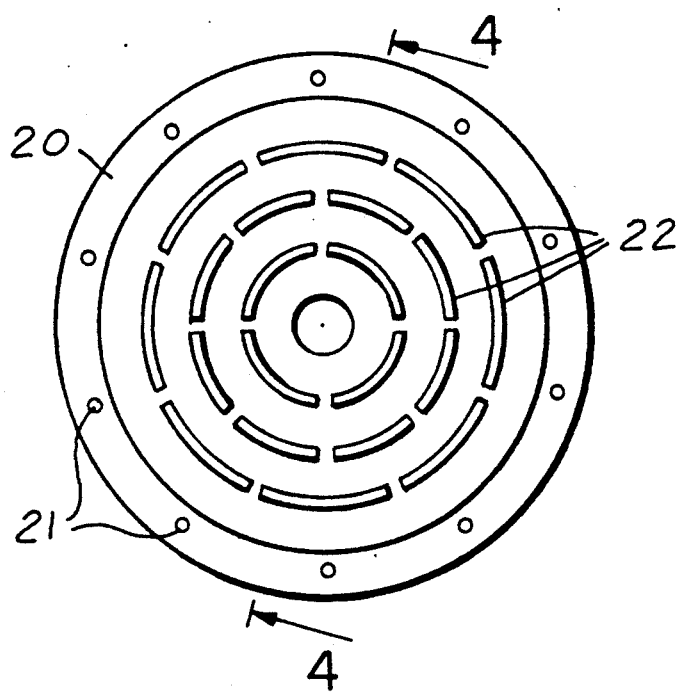
FIG. 3 is a plan view of a front plate of an alternator according to the present invention taken along the line 3—3 of FIG. 2.

FIGS. 2, 3 and 4 show additional cooling means which may be incorporated in an alternator according to the present invention. Accordingly, front cover 20 has a plurality of cooling fins 22 formed on the inside surface of the cover. These fins form three concentric rows shown in FIG. 3; and, as shown in FIG. 4, the fins extend some distance back from the front cover. The broken away section of FIG. 2 showing the inside of alternator 16 also shows that the rear cover of the alternator has a plurality of fins 24 formed therein for the same purpose—additional dissipation of heat formed within the alternator. Those skilled in the art will further appreciate that other types of fins could be used with an alternator according to the present invention.

An alternator and intake manifold system according to the present invention provides quiet operation even at high power output from the alternator because a system according to this invention obviates the need for a cooling fan in the alternator and provides further vibration and noise reduction because of the rigid mounting afforded by the manifold to alternator interface of this invention.

While the invention has been shown and described in its preferred embodiments, it will be clear to those skilled in the arts to which they pertain that many changes and modifications may be made thereto without departing from the scope of the invention.

We claim:

1. An intake manifold and alternator system for a multicylinder internal combustion engine, comprising:
    a manifold having a plurality of passages for conveying intake charge to a plurality of cylinders of said engine and at least one primary coolant passage permitting the flow of engine coolant through the manifold, said manifold further comprising a generally cylindrical cavity adapted for housing an alternator therein, with the central axis of said cavity being parallel to the crankshaft of the engine;
    an alternator driven by an endless belt powered by the crankshaft of said engine, with said alternator having a generally cylindrical outer body housed within said cavity; and an alternator cooling circuit comprising a secondary coolant passage within said manifold for conducting coolant from said primary passage to a generally annular passage formed by said outer body and said cavity, and a discharge passage for conducting coolant from said cavity.

2. An intake manifold and alternator system according to claim 1, wherein said engine comprises a V-shaped cylinder block, with said manifold being mounted to the top of said block, and with said alternator being driven by the crankshaft of said engine.

3. An intake manifold and alternator system according to claim 1, wherein said alternator is adapted to be inserted into said cavity from the front of said engine.

4. An intake manifold and alternator system according to claim 1, wherein said cavity is defined by a generally annular wall extending from at least one of said intake charge passages in a direction parallel to the crankshaft of the engine.

5. An intake manifold and alternator system for an internal combustion engine, comprising:
a manifold having a plurality of passages for conveying intake charge to a plurality of cylinders of said engine and at least one primary coolant passage permitting the flow of engine coolant through the manifold;
an alternator driven by said engine, with said alternator being housed within a cavity formed in said manifold; and
a secondary coolant passage for conducting coolant from said primary passage to said cavity.

6. An intake manifold and alternator system according to claim 5, wherein coolant conducted to said cavity flows through a space defined by said alternator and said cavity.

7. An intake manifold and alternator system for an internal combustion engine, comprising:
a manifold having a plurality of passages for conveying intake charge to a plurality of cylinders of said engine and at least one primary coolant passage permitting the flow of engine coolant through the manifold;
an alternator driven by said engine, with said alternator having a generally cylindrical outer body housed within a generally cylindrical cavity formed in said manifold; and
an alternator cooling circuit comprising a secondary coolant passage within said manifold for conducting coolant from said primary passage to a generally annular passage formed by said outer body and said cavity, and a discharge passage for conducting coolant from said cavity.

8. An intake manifold and alternator system according to claim 7, wherein said alternator comprises a sealed housing having a rotor mounted therein.

9. An intake manifold and alternator system according to claim 7, wherein said alternator comprises a sealed housing having a rotor journaled therein, with said housing further comprising heat transfer means for conducting heat from inside said housing.

10. An intake manifold and alternator system according to claim 9, wherein said heat transfer means comprises at least one set of conducting structures formed on at least one inner surface of said housing.

11. An intake manifold and alternator system for an internal combustion engine, comprising:
a manifold for conveying intake charge to a plurality of cylinders of said engine; and
an alternator driven by said engine, with said alternator being housed within said manifold.

12. An intake manifold and alternator system according to claim 11, wherein said manifold comprises a plurality of intake charge passages and at least one passage for conducting liquid coolant from said engine to said alternator.

* * * * *